С010089148B1

United States Patent
Blitzer et al.

(10) Patent No.: US 10,089,148 B1
(45) Date of Patent: Oct. 2, 2018

(54) METHOD AND APPARATUS FOR POLICY-BASED REPLICATION

(75) Inventors: Aharon Blitzer, Shoham (IL); Aviram Katz, Kiryat Onno (IL); Roy Dahan, Ashdod (IL); David C. Dysert, Holliston, MA (US); Ananthan K. Pillai, Norwood, MA (US); Christopher J. Hackett, Boylston, MA (US); Peter A. Bouchard, Norton, MA (US); Puneet B. Lal, Shrewsbury, MA (US); Hamid R. Farshi, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 197 days.

(21) Appl. No.: 13/174,314

(22) Filed: Jun. 30, 2011

(51) Int. Cl.
*G06F 9/50* (2006.01)

(52) U.S. Cl.
CPC .................................. *G06F 9/5027* (2013.01)

(58) Field of Classification Search
CPC ......... G06F 9/4881; G06F 9/50; G06F 9/5027
USPC ................. 707/611, 694, 681, 622, 634, 769
See application file for complete search history.

(56) References Cited

U.S. PATENT DOCUMENTS

| | | | | |
|---|---|---|---|---|
| 7,769,722 B1* | 8/2010 | Bergant et al. | ............... | 707/681 |
| 8,261,033 B1* | 9/2012 | Slik et al. | ..................... | 711/162 |
| 8,332,369 B2* | 12/2012 | Kol et al. | ....................... | 707/694 |
| 2002/0133669 A1* | 9/2002 | Devireddy | ............ | G06F 3/0605 |
| | | | | 711/114 |
| 2005/0010529 A1* | 1/2005 | Zalewski et al. | ................ | 705/54 |
| 2005/0028025 A1* | 2/2005 | Zalewski | ............ | G06F 11/1456 |
| | | | | 714/6.32 |
| 2005/0203908 A1* | 9/2005 | Lam et al. | ...................... | 707/10 |
| 2006/0224741 A1* | 10/2006 | Jackson | ....................... | 709/226 |
| 2006/0230149 A1* | 10/2006 | Jackson | ....................... | 709/226 |
| 2008/0082770 A1* | 4/2008 | Ahal et al. | ..................... | 711/162 |
| 2008/0256593 A1* | 10/2008 | Vinberg et al. | .................... | 726/1 |
| 2010/0175049 A1* | 7/2010 | Ramsey et al. | ............... | 717/115 |
| 2010/0179941 A1* | 7/2010 | Agrawal et al. | ............. | 707/624 |
| 2010/0223287 A1* | 9/2010 | Lim | .............................. | 707/769 |
| 2010/0251252 A1* | 9/2010 | Laverone et al. | ............ | 718/104 |
| 2011/0251996 A1* | 10/2011 | Sustman et al. | ............. | 707/622 |

(Continued)

*Primary Examiner* — Taelor Kim
(74) *Attorney, Agent, or Firm* — Daly, Crowley, Mofford & Durkee, LLP

(57) ABSTRACT

Currently, administrators configure replication manually according to a data protection policy. Typically, such data protection policies are provided via a script or a similar input to provision storage devices. However, such manual configuration is subject to administrator error. For example, an administrator may not provision storage devices accurately according to a desired data protection policy. Further, this process is subject not only to human mistake, but also the administrative overhead required to manually provision the storage devices. Example embodiments of the present invention eliminate administration and reliability issues arising out of manual replication service configuration, thereby minimizing administrative costs and improving the user experience of handling data protection. Example embodiments of the present invention provide a method, an apparatus and a computer-program product for creating a policy-based replication service. The method includes receiving a policy and creating a replication service according to the policy.

21 Claims, 11 Drawing Sheets

(56) References Cited

U.S. PATENT DOCUMENTS

2011/0282834 A1* 11/2011 Desai et al. .................. 707/611
2011/0295806 A1* 12/2011 Erofeev ....................... 707/634
2012/0016840 A1* 1/2012 Lin et al. ..................... 707/626

* cited by examiner

METHOD AND APPARATUS FOR POLICY-BASED REPLICATION

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This application relates to data replication.

BACKGROUND

Data protection (e.g., replication) may be provided by a data protection process that makes a copy of an original set of data at target devices. The copy of data may be used upon the occurrence of an event causing data failure such as may occur, for example, when the original copy of data is destroyed, corrupted, or otherwise unavailable. Different strategies may be used to provide data protection for different types of failures that can occur. A data protection policy (DPP) may be designed to meet data protection criteria or objectives determined in a variety of different ways. Such criteria may be specified in a service level agreement (SLA), by management or administrators, and the like. Once designed, the data protection policy may then be implemented.

SUMMARY

Example embodiments of the present invention provide a method, an apparatus and a computer-program product for configuring policy-based replication. The method comprises receiving a policy and creating a replication service according to the policy.

BRIEF DESCRIPTION OF THE DRAWINGS

The above and further advantages of the present invention may be better under stood by referring to the following description taken into conjunction with the accompanying drawings in which.

DETAILED DESCRIPTION

Currently, administrators configure replication manually according to a data protection policy. Typically, such data protection policies are provided via a script or a similar input to provision storage devices. However, such manual configuration is subject to administrator error. For example, an administrator may not provision storage devices accurately according to a desired data protection policy. Further, this process is subject not only to human mistake, but also the administrative overhead required to manually provision the storage devices.

Additionally, the migration process is one of the most complicated processes of storage administration and also is susceptible to high degrees of administrator error. For example, in addition to the administrator error described above, an administrator may not perform a full migration (i.e., may forget to migrate some data) or may not provision target devices as source devices were provisioned or, alternatively, as required by new organizational requirements (i.e., may not provision the target devices according to a policy in effect at the source devices or a new policy required by the organization t which the data belongs).

Accordingly, example embodiments of the present invention provide solutions to the above problems, and others, by eliminating the administration and reliability issues arising out of manual replication service configuration, thereby minimizing administrative costs and improving the user experience of handling data protection. Example embodiments of the present invention provide a method, an apparatus and a computer-program product for creating a policy-based replication service. The method includes receiving a policy and creating a replication service according to the policy.

Further example embodiments of the present invention, 5 together with the Symmetrix FAST VP (Fully Automated Storage Tiering with Virtual Pools) technology by EMC Corporation of Hopkinton, Mass., as described in U.S. patent application Ser. No. 12/494,622, entitled "FACILITATING DATA MIGRATION BETWEEN TIERS," by Throop, et al., enable full automation of determining replication availability, performance and recoverability (now U.S. Pat. No. 9,279,941).

Figure 1:
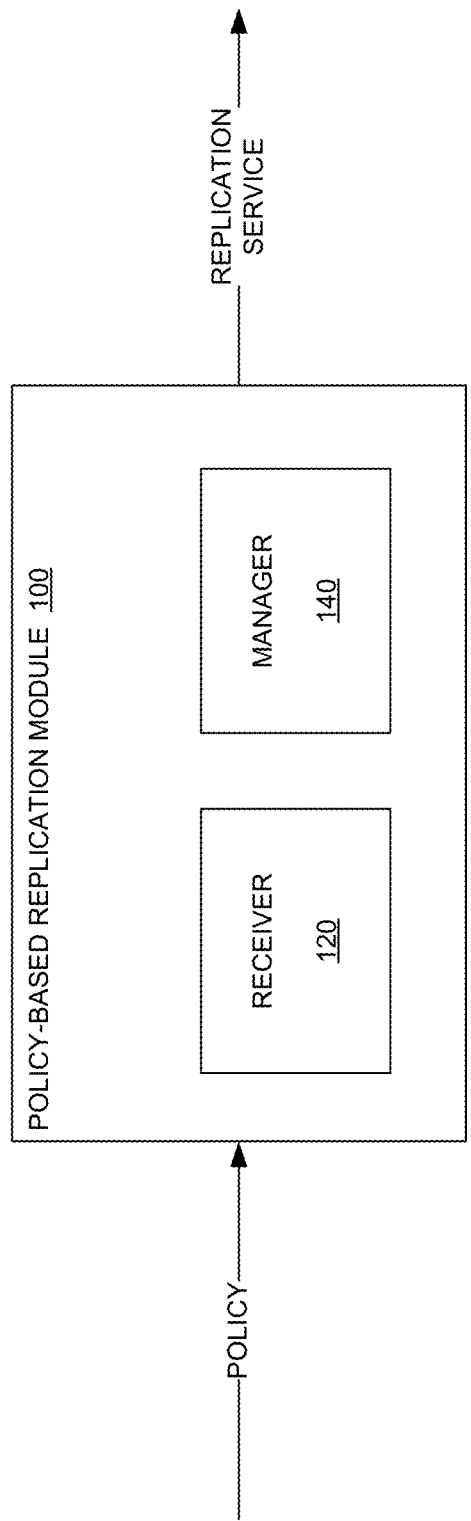
FIG. 1 is a block diagram of a policy-based replication module according to an example embodiment of the present invention.
Figure 2:
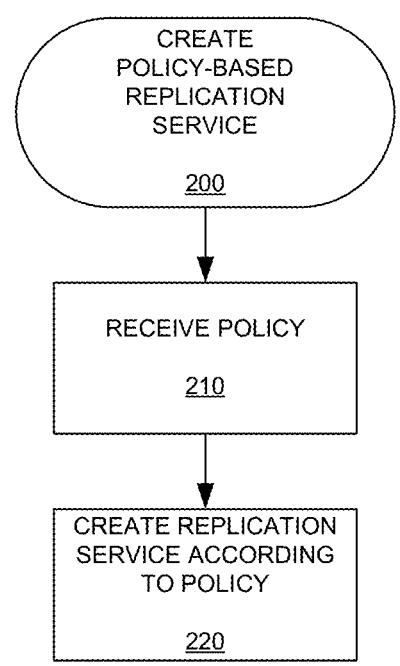
FIGS. 2 and 5 are flow diagrams of methods according to respective example embodiments of the present invention.

FIG. 1 is a block diagram of a policy-based replication module 100 according to an example embodiment of the present invention. The description that follows describes the block diagram of FIG. 1 in conjunction with the flow diagram of FIG. 2 illustrating a method according to an example embodiment of the present invention for creating a policy-based replication service (200). As illustrated in FIG. 1, the policy-based replication module 100 includes a receiver 120 and a manager 140. The receiver 120 is configured to receive a policy (210), such as from a user. The manager 140 is configured to create a replication service according to the policy (220). As will be described below, the replication service may be configured on storage, such as a storage array.

FIGS. 3A-3E are screenshots of a protection policy editor interface 300 and a protection rule editor interface 350, respectively, according to an example embodiment of the present invention. An administrator knows or is made aware of a desired policy, and its various attributes, to be implemented. Accordingly, the protection policy editor interface 300 of FIGS. 3A-3B and the protection rule editor interface 350 of FIGS. 3C-3E allow the administrator to enable creation of a replication service according to a policy by providing the administrator the ability to specify the policy. Therefore, the administrator defines the policy according to attributes provided in one or more of the fields in the protection policy editor interface 300 and the protection rule editor interface 350 (i.e., the replication needs to be able to recover from disaster at local site, provide replication at local site, or use replication to a remote site).

Figure 3A:
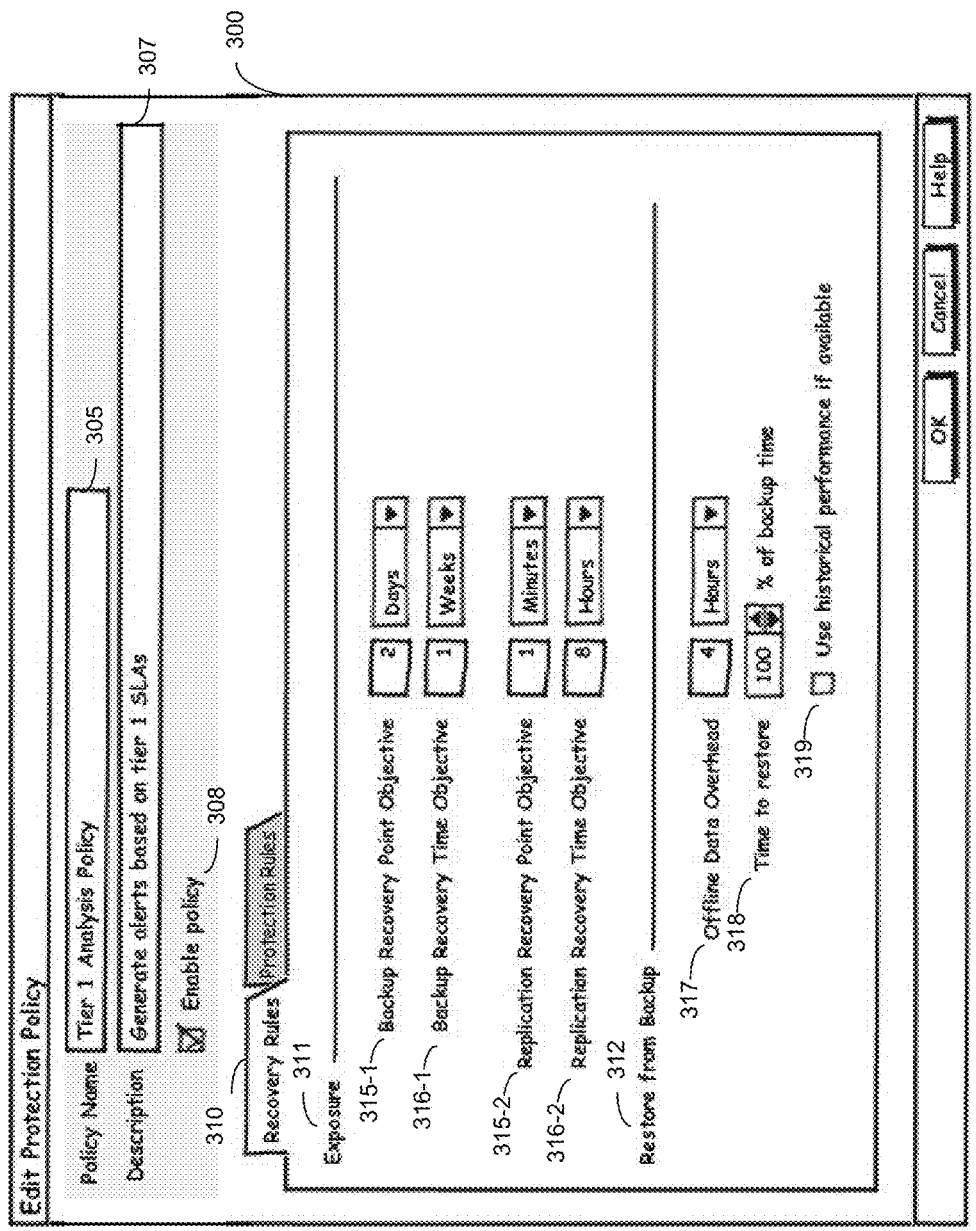
FIGS. 3A-3B are screenshots of a protection policy editor interface according to an example embodiment of the present invention.
Figure 3B:
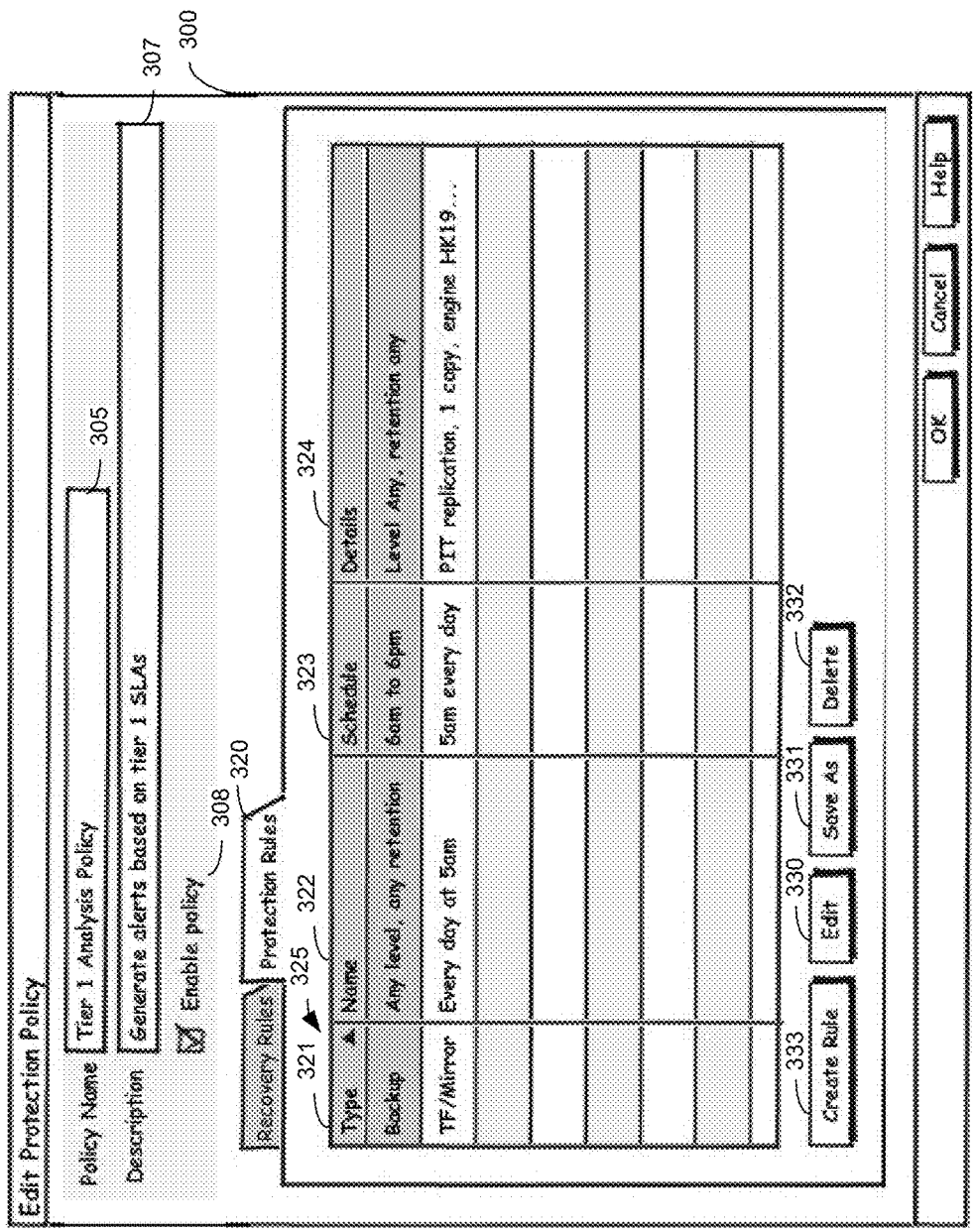

FIGS. 3A-3B are screenshots of a protection policy editor interface 300 according to an example embodiment of the present invention. The protection policy editor interface 300 allows a user or administrator to provide policy attributes and a policy assignment to the receiver 120 to enable the manager 140 to create a replication service according to the policy. The protection policy editor interface 300 includes a field for providing a policy name 305 and a rule description 307 which, in certain embodiments, may persist through the display of various tabs providing inputs for different categories of policy attributes. The policy also may be enabled/disabled 308 via the interface. For example, the Tier 1 Analysis Policy 305 is enabled 308 and, according to its description, "Generate[s] alerts based on tier 1 SLAs." As will be described below, the protection policy editor interface, together with the protection rule editor interface 350 of FIGS. 3C-3D, provides several fields to input the policy attributes and policy assignment, such as attributes relating to identifying data to be protected, how to protect the data and when to protect the data.

As illustrated in FIG. 3A, a recovery rules tab 310 of the policy editor interface 300 includes fields for specifying recovery exposure 311 and how to restore from backup 312. For example, recovery exposure attributes 311 may include recovery point objective (e.g., backup recovery point objective 315-1 and replication recovery point objective 315-2) and recovery time objective (e.g., backup recovery time objective 316-1 and replication recovery time objective 316-2). Fields regarding how to restore from backup 312 may include an amount of time for offline data overhead 317, a percentage of the amount of backup time to restore 318 and an option to use historical performance.

FIG. 3B shows the protection rules tab 320 of the policy editor interface 300. In this example embodiment, the protection rules tab 320 shows rules in effect for a policy, here the Tier 1 Analysis Policy 305. For example, as illustrated in FIG. 3B, two rules (i.e., Any level, any retention and Every day at 5 am) 322 are shown, sorted 325 by type 321, including schedule 323 information and other details 324. Via the interface 300, an administrator may edit 330 existing rules, save 331 the policy 305 including the rules, delete 332 one or more rules from the policy 305 or create a rule 333 for inclusion in the policy 305.

Figure 3C:
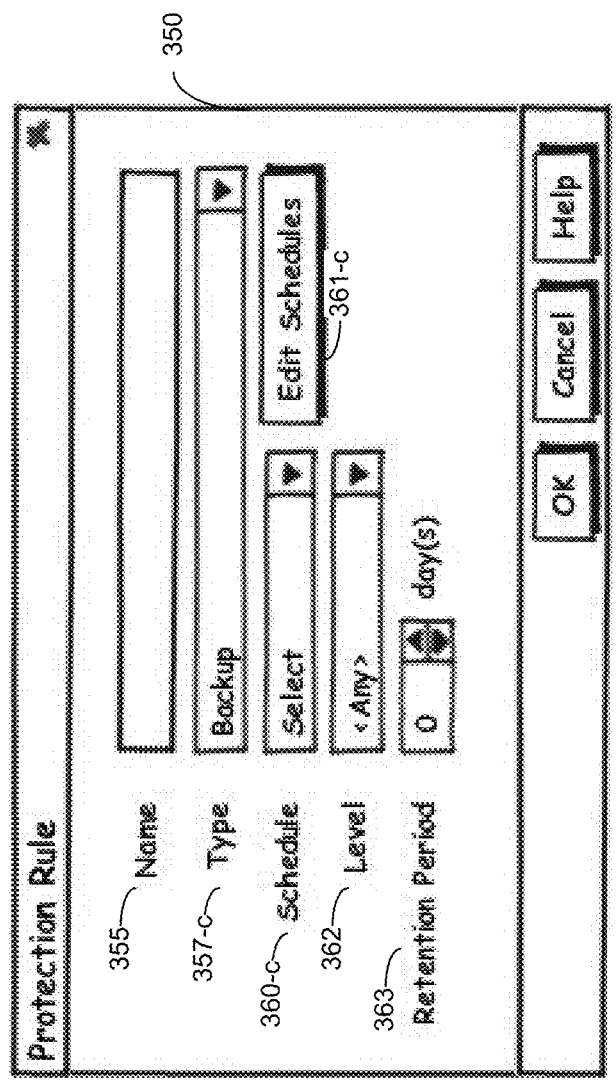
FIGS. 3C-3E are screenshots of a protection rule editor interface according to an example embodiment of the present invention.
Figure 3D:
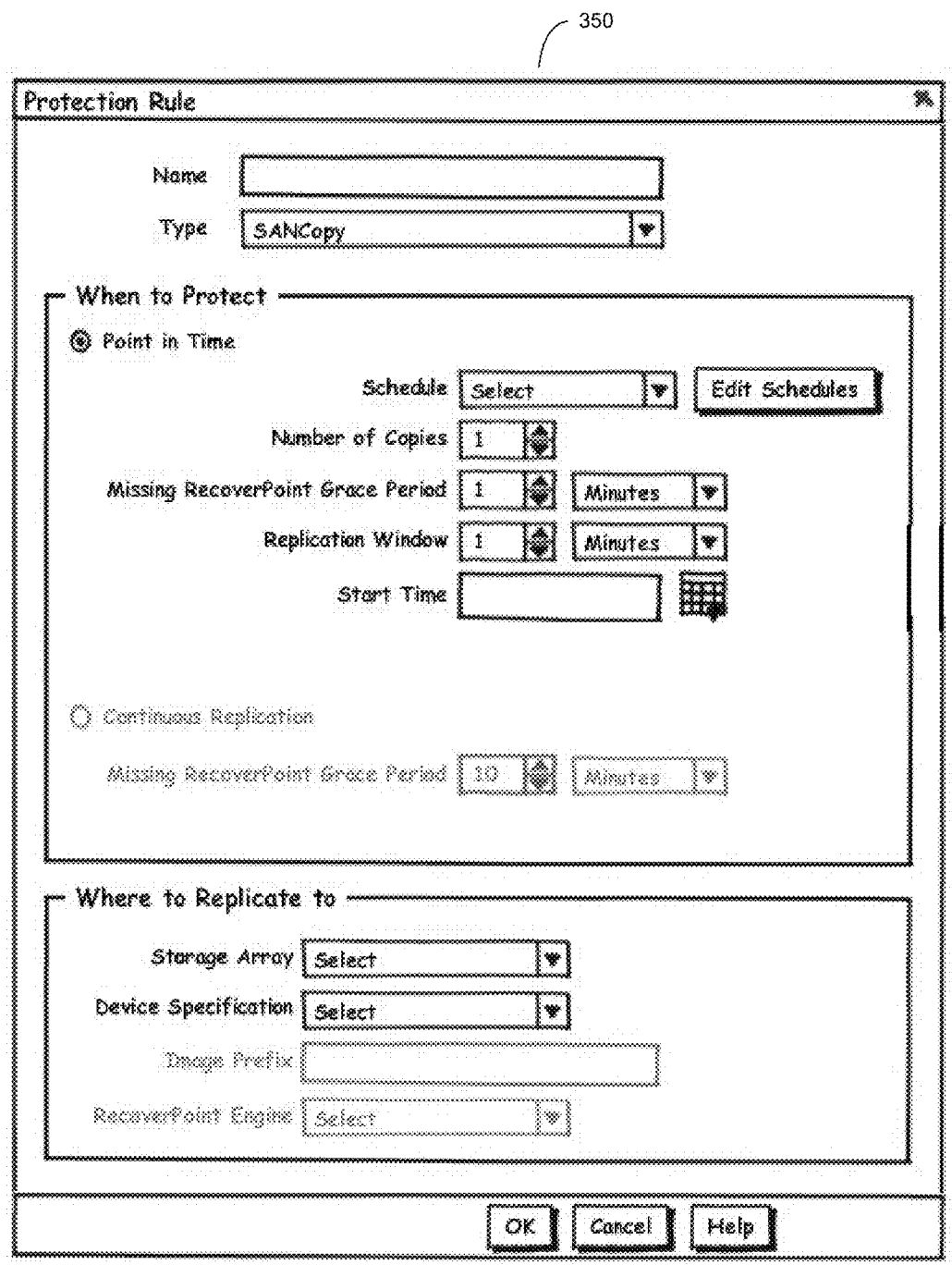

FIGS. 3C-3D are screenshots of a protection rule editor interface 350 according to example embodiments of the present invention. Although the dialogue boxes of the interface 350 illustrates in FIGS. 3C-3D are of different sizes, it should be understood that the dialogue boxes may dynamically resize according to administrator selections to display fields for providing protection rule attributes.

As illustrated in FIG. 3C, an administrator may select a protection rule type to be backup 357-c. Along with the protection rule name 355, the administrator may then provide the attributes necessary for a backup-type protection rule, including a schedule 360-c (which may be edited 361-c), a level 362 (e.g., full backup or archive) and a retention period 363 for the backup. For example, the level 362 may be full backup, incremental backup Likewise, as illustrated in FIG. 3D, an administrator may select the protection rule type to be SANCopy 357-d. As described above, selection of differing protection rule types may cause the protection rule editor interface 350 to change shape/size in order to display fields respective to each type of protection rule. For a SANCopy-type 357-d protection rule, the protection rule editor interface 350 displays fields for attributes relating to when to protect 370 and where to replicate to 385.

First, an administrator may select a further refinement of the replication type, such as point in time 370a or continuous replication 370b. For a point in time replication 370a, a schedule 360-d may be selected or edited 361 and a number of copies 371 may be provided. Further, a number of minutes acceptable for a recovery point to be missing 372a may be provided, with a selection of a number of minutest that should be covered by the replication window 373 and a start time for replication 374. For continuous replication 370b, the administrator likewise may select a number of minutes acceptable for a recovery point to be missing 372b.

To specify where the replica should be replicated to 385, the administrator may select a storage array 386 from a configuration and a particular device 387 (physical or logical). The administrator optionally also may provide an image prefix 388 providing an indication to what the replica pertains and a recoverpoint engine 389 regarding the type of replication technology to be used for the replica.

Figure 3E:
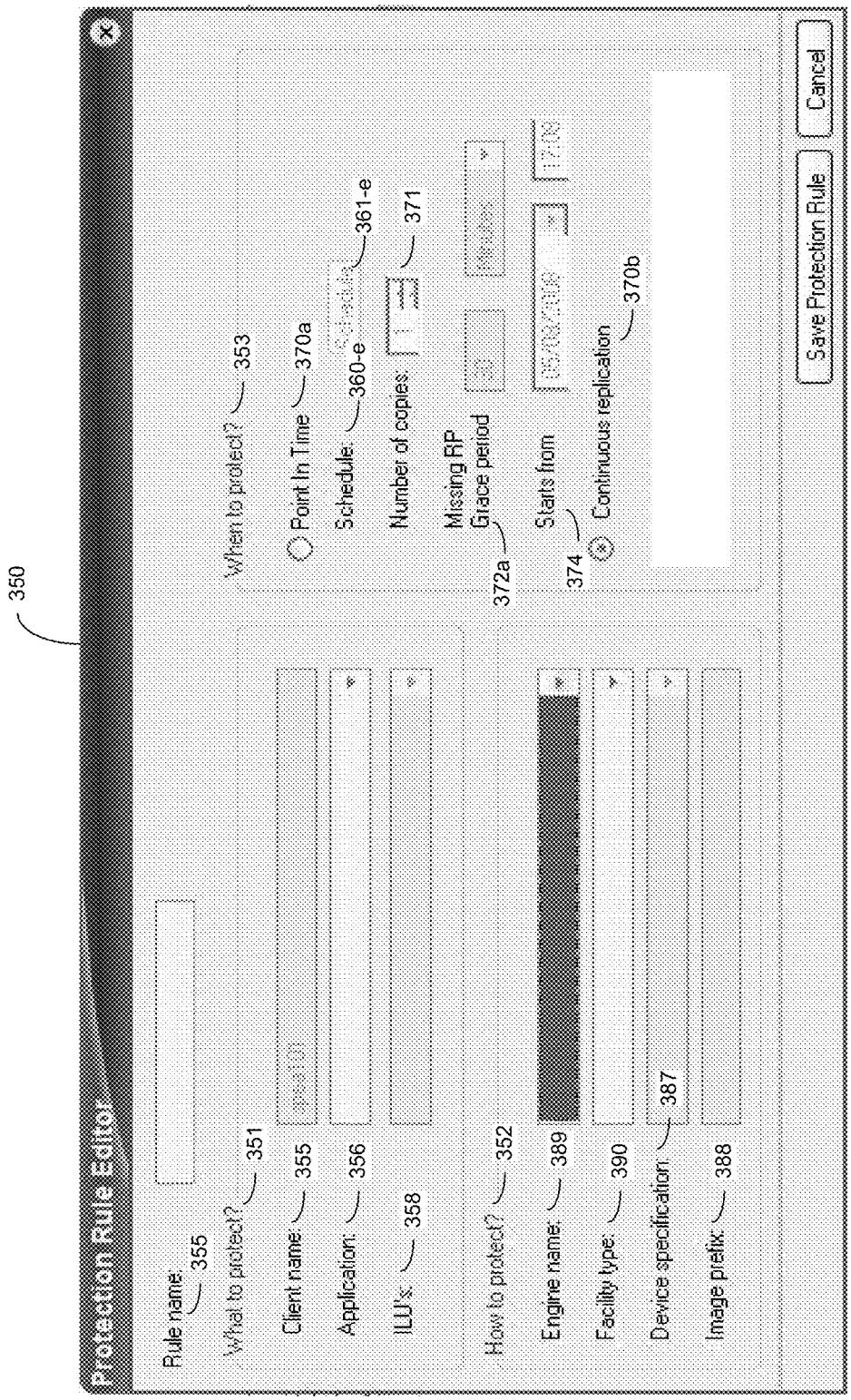

FIG. 3E is a further example embodiment of a protection rule editor interface 350 according to the present invention. The administrator may provide a rule name 355. Further, the administrator may define what data the rule should protect 351. For example, the administrator may provide a policy assignment, such as providing a client name 355, an application 356 or individual logical units (ILUs) 358. In other example embodiments, the administrator may assign the rule (i.e., policy) to a file system, a host or a business unit (e.g., finance, marketing, legal).

In further example embodiments, the administrator may provide a policy purpose (e.g., disaster recovery, operational recovery, logical corruption and archive). Disaster recovery provides recovery from a failure at a production site of a replication service. Accordingly, a remote replication site is provided to protect the data. Operational recovery protects provides a replica at a local site, so that if something happens to primary storage, the replica may be mounted to run applications. Logical corruption recovery provides recovery from failures not necessarily caused by a storage failure but rather user error (e.g., the user changes or deletes information on by mistake or even on purpose). Accordingly, information is retrieved from a replica, rather than switching to the replica for primary storage. Archive may relate to long-term storage of data, such as for complying with regulations.

The administrator also may provide policy attributes regarding how to protect the data 352 that, in certain embodiments, may be mandatory or optional. For example, the administrator may provide an engine (i.e., storage array) name 389 (i.e., a particular storage array), a facility (i.e., replication technology (e.g., Symmetrix, snapshot)) type 390, a device specification 387 (i.e., which device should be replicated) and an image prefix (i.e., prefix to the name of the replica that should be created) 388. In alternate embodiments, the administrator may specify a replication location (e.g., remote or local), an engine tier (i.e., storage array performance/availability), an engine type (e.g., Symmetrix or CLARiiON, both by EMC Corporation of Hopkinton, Mass.) (i.e., not by tier but by engine), a resource pool and a priority (i.e., if bandwidth between local and remote sites is limited and insufficient for a number of applications to be replicated).

Further, the administrator also may provide policy attributes regarding when to protect the data 353. For example, the administrator may select a replication type (e.g., pointin-time (PIT) 370*a*, continuous data protection (CDP) 370*b* or snapshot). For point-in-time replication, the administrator can set a schedule 360-*e*, 361-*e*, a number of copies 371, a time to keep (i.e., copy retention time), a recovery point objective (RPO) (i.e., a maximum amount of time data may be lost), a recovery point grace period 372*a*, also referred to as a recovery point object (RPO) tolerance (i.e., how long a RPO violation may continue until an alert should be reported), a recovery time objective (RTO) (i.e., an accepted time to recover from a failure) and when to start 374.

According to the attributes provided by the administrator, example embodiments of the present invention know which components should be included in the replication. In this way the user defines the policy and then assigns the policy to one or more groups, hosts, applications, or ILU. Additionally, the user can specify RPO & RTO or can specify the way replication should occur. Therefore, example embodiments of the present invention may create the replication service automatically.

Figure 4:
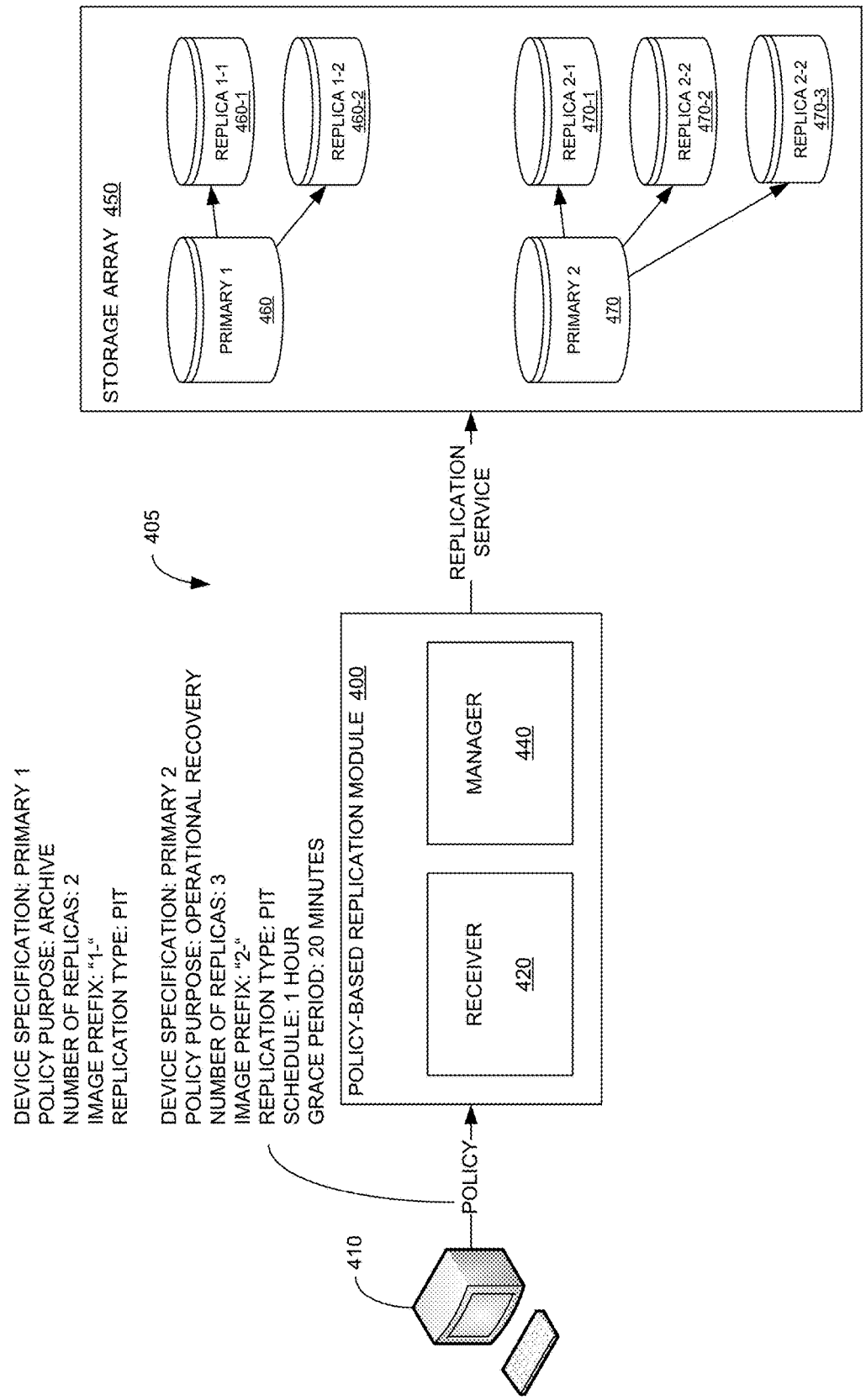
FIGS. 4 and 6 are block diagrams of systems including a policy-based replication module according to respective example embodiments of the present invention.
Figure 5:
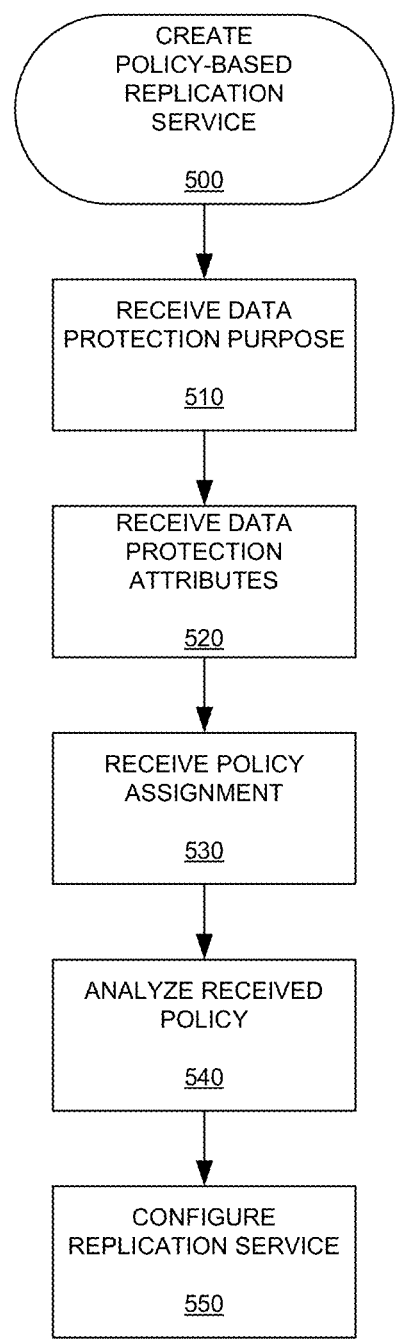

FIG. 4 is a block diagram of a system 405 including a policy-based replication module 400 according to an example embodiment of the present invention. The description that follows describes the block diagram of FIG. 4 in conjunction with the flow diagram of FIG. 5 illustrating a method according to an example embodiment of the present invention for creating a policy-based replication service (500).

First, the receiver 420, which is configured to receive a policy, may receive a policy (i.e., 210 of FIG. 2) via an administrator terminal 410 via a graphical user interface (e.g., as illustrated in FIG. 3). In other example embodiments, the receiver 420 may receive the policy via a command line interface (CLI) or an application programming interface (API), which also may be provided by the administrator terminal 410. In other words, the receiver 420 may retrieve the data protection policy from a user or administrator via a GUI, CLI or API by presenting the interface to an administrator for population and then receive the parameters of the policy provided via the interface, from a third-party product (i.e., any external data source) or by building the policy from a current state, as described in U.S. Pat. No. 7,840,595 entitled "TECHNIQUES FOR DETERMINING AN IMPLEMENTED DATA PROTECTION POLICY" to Blitzer et al, incorporated herein by reference in its entirety.

For example, the receiver 420 may receive a data protection purpose (510), receive data protection attributes (520) and receive a policy assignment (530) from the administrator, who may provide data protection attributes via the administrator terminal (i.e., via the GUI, CLI or API) thereby defining a specified replication service as illustrated in FIG. 4 (i.e., Device Specification: Primary 1, Policy Purpose: Archive, Number of Replicas: 2, Image Prefix: "1-", Replication Type: PIT; Device Specification: Primary 2, Policy Purpose: Operational Recovery, Number of Replicas: 3, Image Prefix: "2-", Replication Type: PIT, Schedule: 1 Hour, Grace Period: 20 Minutes). As will be described below, the policy includes information necessary for the manager 440 to create replication jobs for the replication service. Receiving the policy assignment (530) may include receiving an existing replication environment (e.g., hosts, applications, file systems, storage arrays (disks, devices, pools, ports, licenses) and backup servers (libraries, volumes, pools, licenses, tapes, devices).

Having received the policy attributes, the manager 440 then may analyze the received policy (540) to create replication jobs for a policy-based replication service for provisioning at a storage array 450 specified in the policy attributes. Accordingly, the manager 440 of the policy-based replication module 400 may automatically configure (i.e., provision) the replication service (550) according to the replication jobs it created according to the data protection policy attributes received by the receiver 420. Therefore, as a result of the provisioning, as illustrated in FIG. 4, the storage array 450 may include a first primary storage device (i.e., primary 1) 460 having two replicas, replica 1-1 460-1 and replica 1-2 460-2, configured for archive; and a second primary storage device (i.e., primary 2) 470 having three replicas, replica 2-1 470-1, replica 2-2 470-2 and replica 2-3 470-3, configured for operational recovery.

While FIG. 4 illustrates the policy-based replication module 400 as separate from the administrator terminal 410 and the storage array 450, it should be understood that the policy-based replication module 400 may be included in the administrator terminal 410, the storage array 450, or any other computer system capable of managing the storage array 450.

In certain embodiments, the replication service configuration process starts upon the occurrence of an event (i.e., at times a change is detected in the policy), such as a new data protection rule being associated to the replication service, a data protection rule being disconnected from the replication service, a data protection rule being changed, a data protection rule being added, a data protection rule being deleted, a data protection rule being disabled and a data protection rule being enabled. Accordingly, detection of such a change to the policy will cause the policy-based replication module 400 to create a replication service. For example, for a new data protection rule associated with a replication service, the policy-based replication module 400 will detect a policy associated with an application requires updating according to the new data protection rule. Accordingly, the policy-based replication module 400 will create a replication for application according to the policy as changed by the new rule. Likewise, when a data protection rule is disconnected from a replication service or application, the policy-based replication module 400 will determine whether the replication should be stopped. In short, if the policy-based replication module 400 detects a change to a data protection rule, that event will cause the policy-based replication module 400 to determine whether a corresponding change should be made to the replication.

Figure 6:
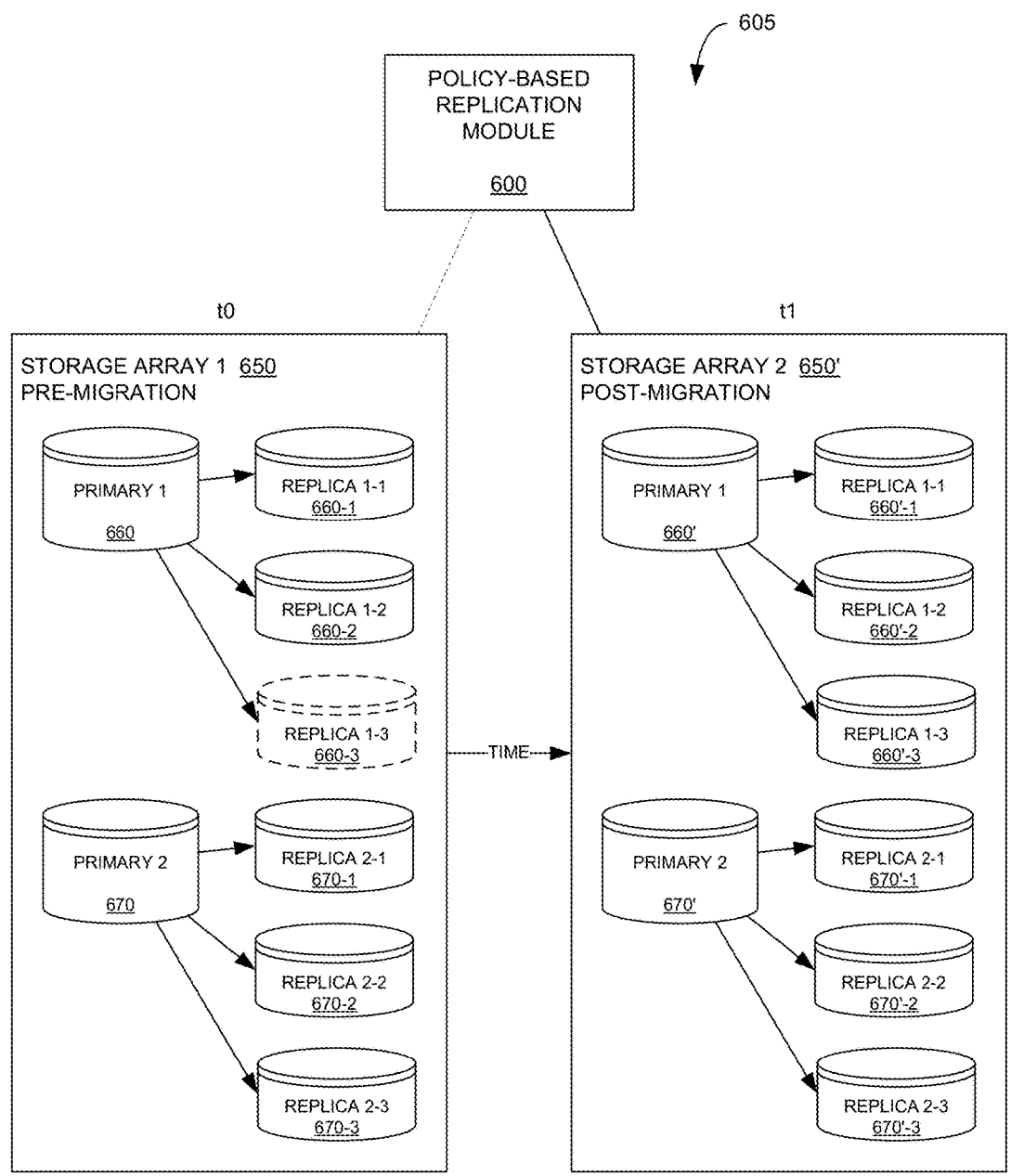

FIG. 6 is a block diagram of a system 605 including a policy-based replication module 600 according to an example embodiment of the present invention. FIG. 6 illustrates migration of a replication service from a first storage array (i.e., storage array 1) 650 to a second storage array (i.e., storage array 2) 650'. However, it should be understood that example embodiments of the present invention are applicable to any policy-based replication scenario including, but not limited to, migration, adding a new application and assigning a policy to an application. In an embodiment in which the replication service is not changing during the migration from the first storage array 650 to the second storage array 650' (as indicated by the hashed line connecting the policy-based replication module 600 and the first storage array 650), the policy-based replication module 600 may build the pre-migration replication policy in effect at the first storage array 650 according to the device allocation information and the replication information. Methods for building policies are described in U.S. Pat. No. 7,840,595, entitled "TECHNIQUES FOR DETERMINING AN IMPLEMENTED DATA PROTECTION POLICY," to Blitzer et al. and assigned to EMC Corporation of Hopkinton, Mass. This policy then may be received by the receiver (not shown) and used by the manager (not shown) to automatically create the post-migration replication service at the second storage array 650'.

However, as illustrated at the first storage array 650 of FIG. 6, an administrator desires that the replication service at time t0 includes a third replica 1-3 660-3 of the first primary disk 660 (as indicated by the hashed illustration of the replica 1-3 660-3). The administrator then may notify the policy-based replication module 600 that the administrator has implemented a new policy for implementation at the second storage array 650'. Accordingly, as described above with respect to FIGS. 4-5, the receiver may receive a policy and create a post-migration replication service at the second storage array 650' according to the policy.

Therefore, after the migration of the replication service from the first storage array 650 to the second storage array 650', at time t1 the replication service includes a replication of a first primary disk (i.e., primary 1) 660' to three replicas (i.e., replica 1-1, replica 1-2 and replica 1-3) 660'-1, 660'-2, 660'-3 and a replication of a second primary disk (i.e., primary 2) 670' to three replicas (i.e., replica 2-1, replica 2-2 and replica 2-3) 670'-1, 670'-2, 670'-3. Thus, the replication service at the second storage array 650' at time t1 was provisioned automatically according to the policy desired by the administrator.

Figure 7:
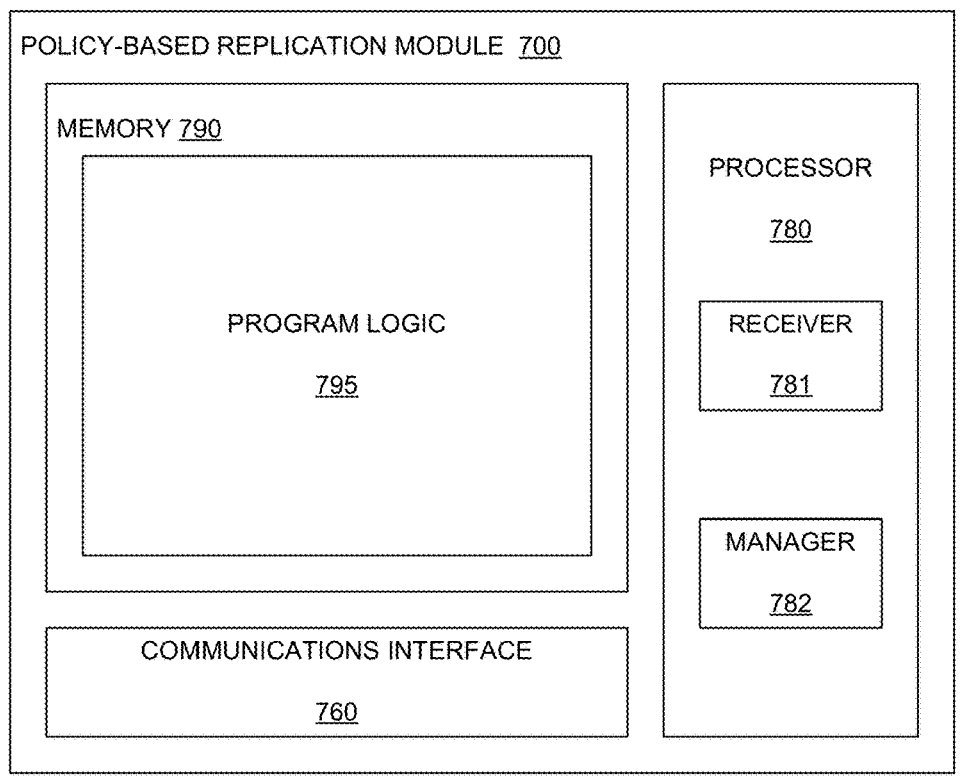
FIG. 7 is a block diagram of an example embodiment apparatus according to the present invention.

FIG. 7 is a block diagram of an example embodiment policy-based replication module 700 according to the present invention. The policy-based replication module 700 includes memory 790 storing program logic 795, a processor 780, a communications interface 760, a receiver 781 and a manager 782.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer of FIG. 7, the machine becomes an apparatus for practicing the invention. When implemented on one or more general-purpose processors, the program code combines with such a processor to provide a unique apparatus that operates analogously to specific logic circuits. As such a general purpose digital machine can be transformed into a special purpose digital machine.

Figure 8:
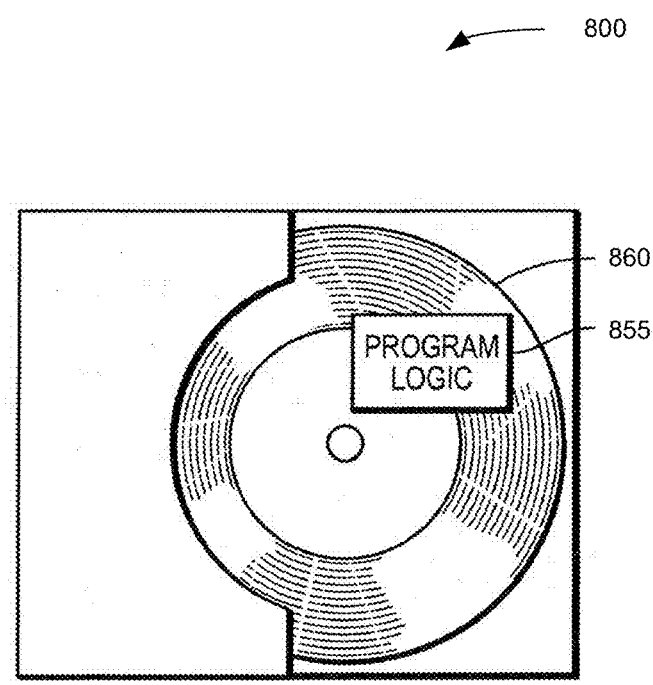
FIG. 8 is an illustration of an example embodiment of the present invention as embodied in program code.

FIG. 8 shows program logic 855 embodied on a computer-readable medium 860 as shown, and wherein the logic is encoded in computer-executable code configured for carrying out the policy-based replication process of this invention and thereby forming a computer program product 800.

The logic for carrying out the method may be embodied as part of the aforementioned system, which is useful for carrying out a method described with reference to embodiments shown in, for example, FIGS. 1-6. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

In reading the above description, persons skilled in the art will realize that there are many apparent variations that can be applied to the methods and systems described. In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A computer-implemented method for creating a policy-based replication service, the method comprising:

receiving a policy assignment, a policy having policy attributes, a replication environment designation, and an indication designating an entity to which the policy is assigned, wherein the replication environment designation comprises information relating to a host and a plurality of storage arrays including first and second storage arrays, and wherein the policy attributes comprise at least one data protection rule and an indication as to which of the plurality of storage arrays the policy applies;

responsive to an instruction to migrate a replication service from the first storage array to the second storage array, automatically analyzing the policy, policy attributes, indication, and replication environment designation associated with the first and second storage arrays, to determine a desired replication configuration;

determining automatically whether a pre-migration replication policy associated with the first array is applicable to build a post-migration replication service at the second array, wherein the determination is based on the desired replication configuration, on whether a data protection rule change has occurred, and on whether a new policy has been received;

if the pre-migration replication policy is applicable, then automatically configuring a first policy-based replication service to operate at the second storage array as the post-migration replication service, wherein the first policy-based replication service is based on the pre-migration policy;

if the pre-migration replication policy is not applicable, then automatically configuring a second policy-based replication service to operate at the second storage array as the post-migration replication service, wherein the second policy-based replication service is implemented in accordance with at least one of the desired replication configuration, the new policy, and the data protection rule change; and provisioning replication environment resources automatically for the respective first or second policy-based replication service, the resource provisioning comprising automatically configuring the second storage array in accordance with the respective first or second policy-based replication service.

2. The method of claim 1 further comprising: receiving a data protection purpose; and receiving data protection attributes.

3. The method of claim 2 wherein the data protection purpose is selected from the group consisting of: disaster recovery, operational recovery, logical corruption and archive; and wherein receiving data protection attributes comprises receiving data protection attributes relating to identifying data to be protected, how to protect the data and when to protect the data.

4. The method of claim 3 wherein attributes relating to identifying data to be protected are selected from the group consisting of: client name, application and individual logical units (ILUs); wherein attributes relating to identifying how to protect the data include at least one of: replication type, engine name, engine type, device specification, facility type, resource pool, image prefix, priority, number of copies, time to keep, location, engine tier, recovery point objective, recovery point objective tolerance and recovery time objective; and wherein attributes relating to identifying when to protect the data are selected from the group consisting of: an indication of a type of replication, including point in time (PIT) replication and continuous replication, and, for PIT replication, a schedule, missing recovery point grace period and an indication of a time from with the PIT replication is to start.

5. The method of claim 1 further comprising automatically creating and provisioning resources for the second policy-based replication service at times that a change is detected in the policy.

6. The method of claim 5 wherein the change detected in the policy is selected from the group consisting of: a new data protection rule is associated to the first replication service, a data protection rule is disconnected from the first replication service, a data protection rule has changed, a data protection rule has been added, a data protection rule has been deleted, a data protection rule has been disabled and a data protection rule has been enabled.

7. An apparatus for configuring a policy-based replication service, the apparatus comprising:
a memory;
a processor in operable communication with the memory;
a receiver in operable communication with the processor, the receiver configured to receive a policy assignment, including a policy having policy attributes, a replication environment designation, and an indication designating an entity to which the policy is assigned, wherein the replication environment designation comprises information relating to a host and a plurality of storage arrays including first and second storage arrays, and wherein the policy attributes comprise at least one data protection rule and an indication as to which of the plurality of storage arrays the policy applies; and
a manager in operable communication with the processor, the manager configured to automatically, in response to the desired replication configuration:
responsive to an instruction to migrate a replication service from the first storage array to the second storage array, automatically analyze, the policy, policy attributes, indication, and replication environment designation associated with the first and second storage arrays, to determine a desired replication configuration;
determine automatically whether a pre-migration replication policy associated with the first array is applicable to build a post-migration replication service at the second array, wherein the determination is based on the desired replication configuration, on whether a data protection rule change has occurred, and on whether a new policy has been received;
if the pre-migration replication policy is applicable, then automatically configure a first policy-based replication service to operate at the second storage array as the post-migration replication service, wherein the first policy-based replication service is based on the pre-migration policy;
if the pre-migration replication policy is not applicable, then automatically configure a second policy-based replication service to operate at the second storage array as the post-migration replication service, wherein the second policy-based replication service is implemented in accordance with at least one of the desired replication configuration, the new policy and the data protection rule change; and
provision resources automatically for the respective first or second policy-based replication service at the second storage array, the resource provisioning comprising automatically configuring the second storage array in accordance with the respective first or second policy-based replication service.

8. The apparatus of claim 7 wherein the receiver is further configured to receive a data protection purpose and receive data protection attributes.

9. The apparatus of claim 8
wherein the data protection purpose is selected from the group consisting of: disaster recovery, operational recovery, logical corruption and archive; and
wherein the receiver is further configured to receive data protection attributes relating to identifying data to be protected, how to protect the data and when to protect the data.

10. The apparatus of claim 9
wherein attributes relating to identifying data to be protected are selected from the group consisting of: client name, application and individual logical units (ILUs); wherein attributes relating to identifying how to protect the data including at least one of: replication type, engine name, engine type, device specification, facility type, resource pool, image prefix, priority, number of copies, time to keep, location, engine tier, recovery point objective, recovery point objective tolerance and recovery time objective; and
wherein attributes relating to identifying when to protect the data are selected from the group consisting of: an indication of a type of replication, including point in time (PIT) replication and continuous replication, and, for PIT replication, a schedule, missing recovery point grace period and an indication of a time from with the PIT replication is to start.

11. The apparatus of claim 7 wherein the manager is further configured to automatically create and provision resources for the second policy-based replication service at times that a change is detected in the policy.

12. The apparatus of claim 11 wherein the change detected in the policy is selected from the group consisting of: a new data protection rule is associated to the first replication service, a data protection rule is disconnected from the first replication service, a data protection rule has changed, a data protection rule has been added, a data protection rule has been deleted, a data protection rule has been disabled and a data protection rule has been enabled.

13. A computer-program product including a non-transitory computer-readable storage medium encoded with computer-program code that, when executed on a processor of a computer, cause the computer to configure a policy-based replication service, the computer-program code comprising:
computer-program code for receiving a policy assignment, a policy having policy attributes, a replication environment designation, and an indication designating an entity to which the policy is assigned, wherein the replication environment designation comprises information relating to a host and a plurality of storage arrays including first and second storage arrays, and wherein the policy attributes comprise at least one data protection rule and an indication as to which of the plurality of storage arrays the policy applies;

computer-program code for automatically analyzing, responsive to an instruction to migrate a replication service from the first storage array to the second storage array, the policy, policy attributes, indication, and replication environment designation associated with first and second storage arrays, to determine a desired replication configuration; and computer-program code responsive to the determination of the desired replication configuration, the computer-program code configured for:

determining automatically whether a pre-migration replication policy associated with the first array is applicable to build a post-migration replication service at the second array, wherein the determination is based on the desired replication configuration, on whether a data protection rule change has occurred, and on whether a new policy has been received;

if the pre-migration policy is applicable, then automatically configuring a first policy-based replication service to operate at the second storage array as the post-migration replication service, wherein the first policy-based replication service is based on the pre-migration policy;

if the pre-migration policy is not applicable, then automatically configuring a second policy-based replication service to operate at the second storage array as the post-migration replication service, wherein the second policy-based replication service is implemented at least in accordance with at least one of the desired replication configuration, the new policy, and the data protection rule change; and automatically provisioning resources for the respective first or second policy-based replication service at the second storage array, the resource provisioning comprising automatically configuring the second storage array in accordance with the respective first or second policy-based replication service.

14. The method of claim 1, wherein the entity comprises at least one of a business unit, an application, a host, and a file system.

15. The method of claim 1, further comprising automatically generating, based at least in part on the desired replication configuration, at least one replication job for the respective first or second policy-based first replication service.

16. The method of claim 1, further comprising:

providing a user interface configured to enable a user to specify at least a portion of information used to determine the desired replication configuration.

17. The method of claim 1, further comprising:

Providing a user interface configured to enable a user to specify at least a portion of information used to determine the desired replication consifugation.

18. The apparatus of claim 7, wherein the manager is further configured to automatically generate, based at least in part on the desired replication configuration, at least one replication job for the policy-based first replication service.

19. The apparatus of claim 7, wherein the entity comprises at least one of a business unit, an application, a host, and a file system.

20. The apparatus of claim 7, further comprising a user interface configured to enable a user to specify at least a portion of information used to determine the desired replication configuration.

21. The computer-program product of claim 13, further comprising:

computer-program code for automatically generating, based at least in part on the desired replication configuration, at least one replication job for the policy-based first replication service.

\* \* \* \* \*